(12) United States Patent
Chandran et al.

(10) Patent No.: US 9,870,708 B2
(45) Date of Patent: Jan. 16, 2018

(54) METHODS FOR ENABLING SAFE TAILGATING BY A VEHICLE AND DEVICES THEREOF

(71) Applicant: Wipro Limited, Bangalore (IN)

(72) Inventors: Ashok Chandran, Alappuzha (IN); Tomson Ganapathiplackal George, Paika (IN)

(73) Assignee: WIPRO LIMITED, Bangalore (IN)

( * ) Notice: Subject to any disclaimer, the term of this patent is extended or adjusted under 35 U.S.C. 154(b) by 51 days.

(21) Appl. No.: 15/078,760

(22) Filed: Mar. 23, 2016

(65) Prior Publication Data

US 2017/0263128 A1    Sep. 14, 2017

(30) Foreign Application Priority Data

Mar. 12, 2016 (IN) .............................. 201641008686

(51) Int. Cl.
*G06K 9/00* (2006.01)
*G08G 1/16* (2006.01)
*G06T 7/00* (2017.01)

(52) U.S. Cl.
CPC .......... *G08G 1/166* (2013.01); *G06T 7/0051* (2013.01); *G06T 2207/30236* (2013.01); *G06T 2207/30252* (2013.01)

(58) Field of Classification Search
CPC .......... G06K 9/00791; G06K 9/00805; G06K 2209/15; G06T 7/50; G06T 7/536; G06T 2207/30236; G06T 2207/30252; G08G 1/16; G08G 1/163; G08G 1/166
See application file for complete search history.

(56) References Cited

U.S. PATENT DOCUMENTS

| | | | |
|---|---|---|---|
| 2013/0302758 A1 | 11/2013 | Wright | G06F 17/00 |
| 2015/0003670 A1* | 1/2015 | Kuehnle | G06K 9/00805 382/103 |
| 2015/0234044 A1 | 8/2015 | Ouchi | G01S 13/93 |
| 2016/0320184 A1* | 11/2016 | Long et al. | G01C 3/08 |

FOREIGN PATENT DOCUMENTS

CN    104897132 A    9/2015    ............... G01C 3/00

* cited by examiner

*Primary Examiner* — Andrew W Johns
(74) *Attorney, Agent, or Firm* — Finnegan, Henderson, Farabow, Garrett & Dunner, LLP

(57) ABSTRACT

Methods and devices enabling safe tailgating by a vehicle are disclosed. In an embodiment, the method includes capturing an image of a standardized identification plate of the at least one leading vehicle; determining a distance between the leading vehicle and a trailing vehicle based on width of the standardized identification plate and perceived pixel width of the captured image; dynamically generating a tailgating zone classifier table based on at least one of one or more vehicle parameters, one or more driving pattern parameters, or one or more driving condition parameters associated with the at least one leading vehicle; and dynamically selecting, by the safe tailgating computing device, one of the plurality of safe distance buffer zones based on the distance between the at least one leading vehicle and the at least one trailing vehicle.

20 Claims, 6 Drawing Sheets

METHODS FOR ENABLING SAFE TAILGATING BY A VEHICLE AND DEVICES THEREOF

TECHNICAL FIELD

This disclosure relates generally to tailgating by a vehicle, and more particularly to methods for enabling safe tailgating by a vehicle and devices thereof.

BACKGROUND

When travelling behind slow vehicles, drivers get frustrated and follow more closely than they should. This is known as tailgating and can lead to rear-end collisions or other accidents. According to National Highway Traffic Safety Administration, tailgating accounts for 23 percent of all motor vehicle accidents and crashes with 2000 deaths and 950000 injuries.

The American Association of State Highway and Transportation Officials states that it takes alert drivers approximately two seconds to see a roadway hazard and react to it. The more space a driver allows between his/her vehicle and the vehicle ahead, the more time the driver has to see a hazard and react safely. Best way for the driver to avoid tailgate accidents is to create a cushion by keeping at least 2 seconds between his/her vehicle and the vehicle ahead. In poor driving conditions this can be increased to 4 seconds to give sufficient stopping time. A system to alert the user in case of tailgating possibility can add a buffer of extra 2 seconds for it to detect a vehicle ahead within the accident range and alert the driver. Current methods available provides a static table to find the safety zone without considering user characteristics/parameters, vehicle characteristics/parameters (such as weight, dimensions, and maintenance history) and characteristics/parameters of the driver of the vehicle ahead and their vehicle characteristics/parameters.

Therefore, there is a need for improving the current methods and provide better way for drivers to avoid tailgating incidents.

SUMMARY

Disclosed herein is a method for facilitating safe tailgating by at least one trailing vehicle behind at least one leading vehicle. The method may include capturing, by a safe tailgating computing device, an image of a standardized identification plate of the at least one leading vehicle, the safe tailgating computing device being disposed on the at least one trailing vehicle; determining, by the safe tailgating computing device, a distance between the at least one leading vehicle and the at least one trailing vehicle based on width of the standardized identification plate and perceived pixel width of the captured image; dynamically generating, by the safe tailgating computing device, a tailgating zone classifier table based on at least one of one or more vehicle parameters, one or more driving pattern parameters, or one or more driving condition parameters associated with the at least one leading vehicle obtained from the captured image of the standardized identification plate, the tailgating zone classifier table comprising a plurality of safe distance buffer zones, each of the plurality of safe distance buffer zones associated with a range of distance values; and dynamically selecting, by the safe tailgating computing device, one of the plurality of safe distance buffer zones based on the distance between the at least one leading vehicle and the at least one trailing vehicle, wherein each of the plurality of safe distance buffer zones is indicative of one or more safe distance alarm levels.

In an aspect of the present disclosure, a safe tailgating computing device is disclosed. The safe tailgating computing device may include at least one processor and a memory coupled to the at least one processor, the memory storing instructions, that when executed by the at least one processor, causes the at least one processor to perform operations. The operations may include capturing an image of a standardized identification plate of the at least one leading vehicle, the safe tailgating computing device being disposed on the at least one trailing vehicle; determining a distance between the at least one leading vehicle and the at least one trailing vehicle based on width of the standardized identification plate and perceived pixel width of the captured image; dynamically generating a tailgating zone classifier table based on at least one of one or more vehicle parameters, one or more driving pattern parameters, or one or more driving condition parameters associated with the at least one leading vehicle obtained from the captured image of the standardized identification plate, the tailgating zone classifier table comprising a plurality of safe distance buffer zones, each of the plurality of safe distance buffer zones associated with a range of distance values; and dynamically selecting one of the plurality of safe distance buffer zones based on the distance between the at least one leading vehicle and the at least one trailing vehicle, wherein each of the plurality of safe distance buffer zones is indicative of one or more safe distance alarm levels.

In another aspect of the present disclosure, a non-transitory computer readable medium having stored thereon instructions, that when executed by the at least one processor, causes the at least one processor to perform operations is disclosed. The operations may include capturing an image of a standardized identification plate of the at least one leading vehicle, the safe tailgating computing device being disposed on the at least one trailing vehicle; determining a distance between the at least one leading vehicle and the at least one trailing vehicle based on width of the standardized identification plate and perceived pixel width of the captured image; dynamically generating a tailgating zone classifier table based on at least one of one or more vehicle parameters, one or more driving pattern parameters, or one or more driving condition parameters obtained from the captured image of the standardized identification plate, the tailgating zone classifier table comprising a plurality of safe distance buffer zones, each of the plurality of safe distance buffer zones associated with a range of distance values; and dynamically selecting one of the plurality of safe distance buffer zones based on the distance between the at least one leading vehicle and the at least one trailing vehicle, wherein each of the plurality of safe distance buffer zones is indicative of one or more safe distance alarm levels.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
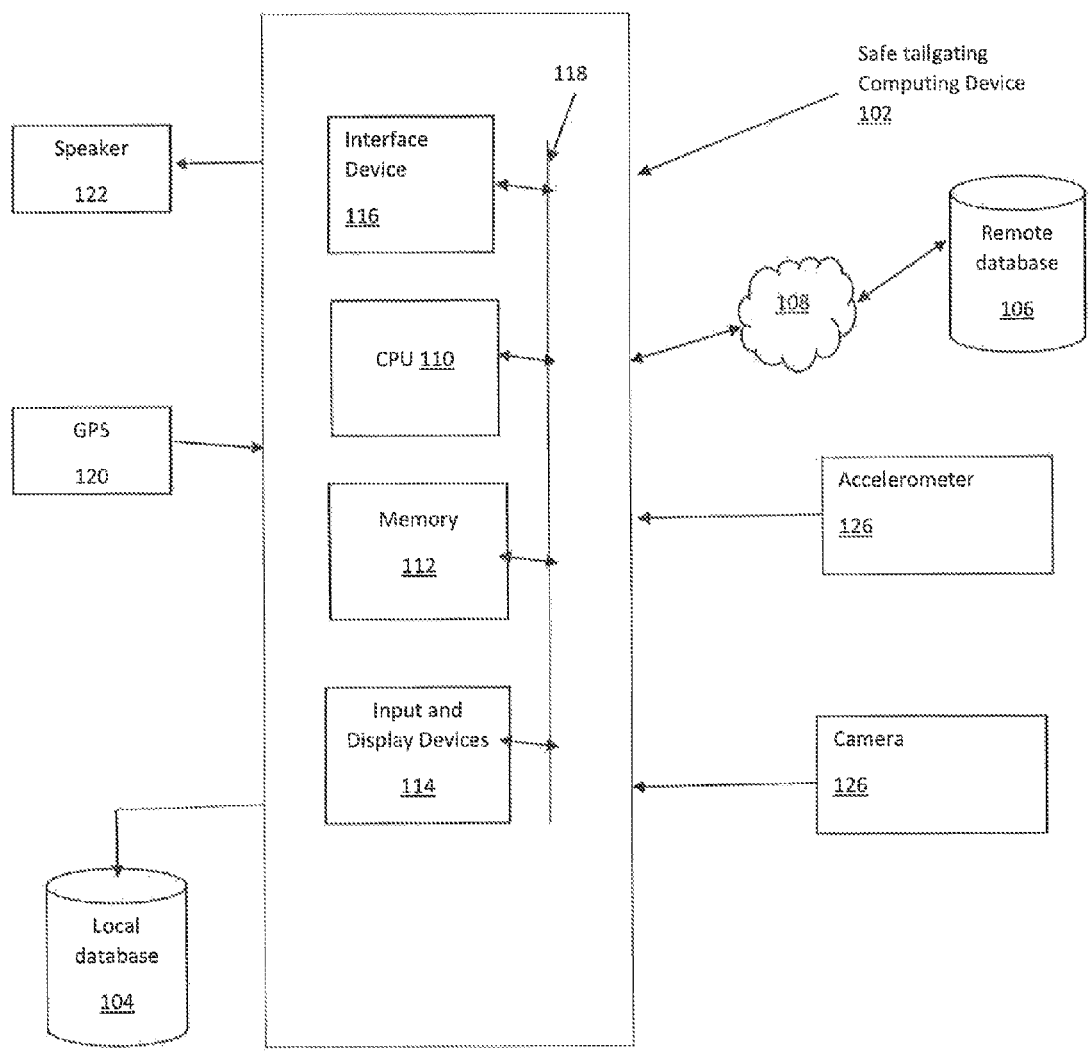
FIG. 1 illustrates an exemplary network environment with a safe tailgating computing device for facilitating safe tailgating in accordance with some embodiments of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

An exemplary network environment 100 with a safe tailgating computing device 102 for facilitating safe tailgating is as illustrated in FIG. 1. By way of example only, the safe tailgating computing device 102 may be a mobile phone. The safe tailgating computing device 102 is in electronic communication with a local database 104 and a remote database 106. The remote database 106 is communicatively coupled to the safe tailgating computing device 102 through a communication network 108. As it would be appreciated by a person having ordinary skill in the art, the communication network 108 in this technology includes local area networks (LAN), wide area network (WAN), 3G technologies, GPRS or EDGE technologies, although the communication network 108 can include any other network topologies. This technology provides a number of advantages including providing more effective methods, non-transitory computer readable medium and devices for facilitating safe tailgating.

The safe tailgating computing device 102 facilitates safe tailgating as illustrated and described with the examples herein, although safe tailgating computing device 102 may perform other types and numbers of functions. Safe tailgating computing device 102 includes at least one processor 110, memory 112, input and display devices 114, interface device 116 which are coupled together by a bus 118, Further, the safe tailgating computing device 102 may include GPS 120, one or more speakers 122, camera 124, an accelerometer 126 although safe tailgating computing device 102 may comprise other types and numbers of elements in other configurations.

Processor(s) 110 may execute one or more computer-executable instructions stored in the memory 112 for the methods illustrated and described with reference to the examples herein, although the processor(s) can execute other types and numbers of instructions and perform other types and numbers of operations. The processor(s) 110 may comprise one or more central processing units ("CPUs") or general purpose processors with one or more processing cores, such as AMD® processor(s), although other types of processor(s) could be used (e.g., Intel®).

Figure 3:
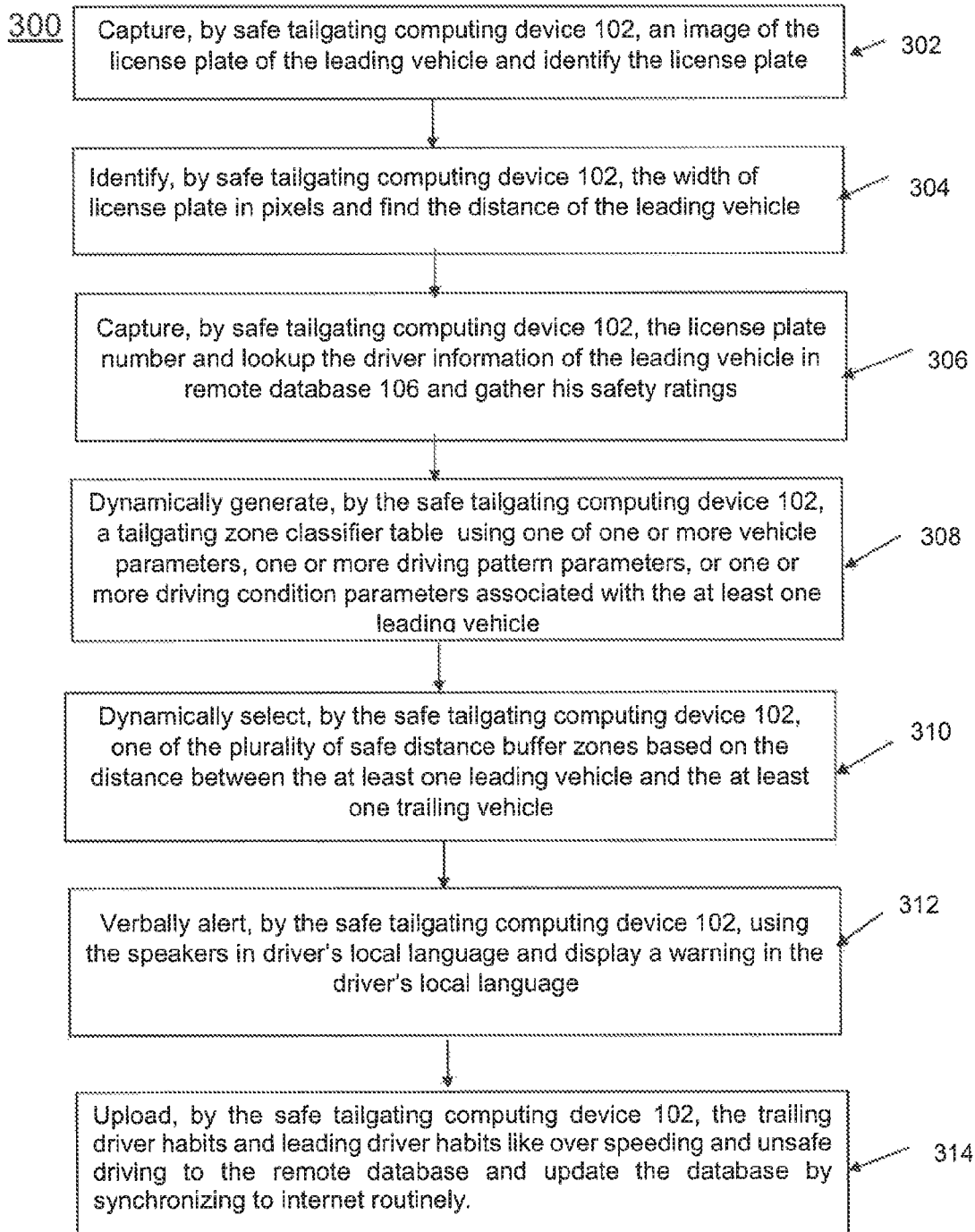
FIG. 3 is a flowchart illustrating a method for calculating a safe distance between the trailing vehicle and the leading vehicle in accordance with some embodiments of the present disclosure.

Memory 112 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 112 may store one or more programmed instructions of this technology as illustrated and described with reference to the examples herein that may be executed by the one or more processor(s) 110. The flow chart shown in FIG. 3 is representative of example steps or actions of this technology that may be embodied or expressed as one or more non-transitory computer or machine readable having stored instructions stored in memory 112 that may be executed by the processor(s) 110.

Input and display devices 114 enable a user, to interact with the safe tailgating computing device 102, such as to input and/or view data and/or to configure, program and/or operate it by way of example only. Input devices may include a touch screen, keyboard and/or a computer mouse and display devices may include a computer monitor, although other types and numbers of input devices and display devices could be used.

Interface device 116 in safe tailgating computing device 102 is used to operatively couple and communicate between safe tailgating computing device 102 and the remote database 106 which are coupled together by the communication network 108.

In this example, bus 118 is a hyper-transport bus in this example, although other bus types and links may be used, such as PCI.

GPS 120 is used to locate the location of the trailing vehicle on which the safe tailgating computing device 102 is mounted.

Speakers 122 are used to provide audio alert to the driver of the vehicle

Camera 124 is used to capture the image of the leading vehicle

Accelerometer 126 is used to determine the speed of the vehicle.

Figure 2:
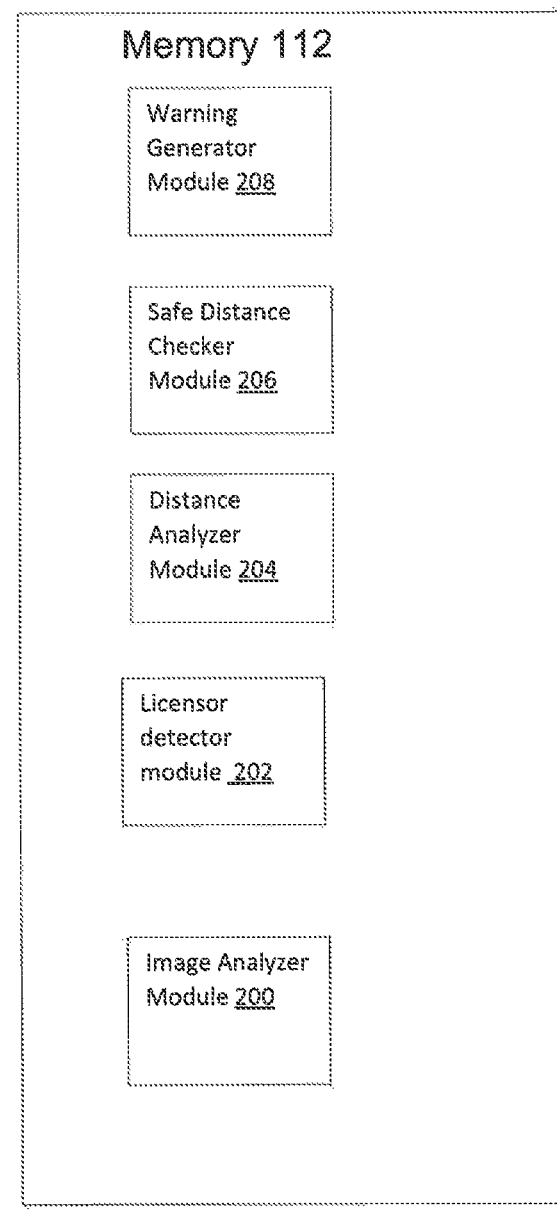
FIG. 2 is a detailed view of memory comprising a plurality of modules, the memory disposed in the safe tailgating computing device in accordance with some embodiments of the present disclosure.

FIG. 2 is a detailed view of the memory 112 comprising a plurality of modules, for example, an image analyzer module 200, license plate detector module 202, distance analyzer module 204, safe distance checker module 206, and warning generator module 208.

Now referring specifically to FIGS. 1 and 2, the above referenced modules function as a mobile application running on the safe tailgating computing device 102 with the camera 124 and the accelerometer 126. The safe tailgating computing device 102 is mounted on a trailing vehicle dashboard with display facing user and the rear camera pointing to road ahead. The camera 124 captures the image of rear portion of the leading vehicle. The image analyzer module 200 analyzes the image of the rear portion to confirm presence of a license plate in the rear portion. Thereafter, the licensor detector module 202 detects the registration number of the leading vehicle using information sourced from the remote database 104 which is a crowd sourced database that stores vehicle and driver parameters/characteristics. Then, the distance analyzer module 204 determines the distance between the leading vehicle and the trailing vehicle using pixel width of the license plate (to be explained in FIG. 3 and FIG. 5). The distance with the leading vehicle is compared with safe distance table by safe distance checker module 206 to check if it falls in safe zone. If not within safe zone limits the driver is alerted by a visual message and alarm generated by warning generator module 208. Warning generator module 208 generates vocal verbal advice to adjust speed using speakers 122. The image captured along with GPS information and license plate details are stored in local database 104. This can be used as proof in case of accidents. In an exemplary implementation, a free drafting zone for the vehicle is identified so that it can save fuel. The drafting zone and tail gating zones will be displayed on input and display devices 114 marked as augmented yellow lines on a live video of the front of the vehicle. Driver of the trailing vehicle is verbally advised on the drafting zone based on the leading vehicle and rating of the driver of the leading vehicle.

Further, the license plate and driver details of the driver are gathered during registration of his/her vehicle, like his/her age, model number of the vehicle etc. and also calculates his/her normalized response time by presenting a puzzle for which the driver has to respond. The readings of the responses from the driver are taken to normalize the driver's response time. This is used for selecting the tailgating safe buffer customized for the driver and his/her vehicle parameters/characteristics. Also, in an implementation, the system presents the driver with a verbal puzzle to understand the mental alertness of the driver. The response level decreases when the driver is drunk or sleepy.

FIG. 3 is a flowchart 300 illustrating a method for calculating a safe distance between the trailing vehicle and the leading vehicle in accordance with some embodiments of the present disclosure.

At step 302, capture, by safe tailgating computing device 102, an image of the license plate of the leading vehicle and identify the license plate. The image of the license plate is captured from the either camera 124 or a separate high resolution front facing camera connected to the trailing vehicle's digital navigational display. It is confirmed that the license plate is a real license plate using OCR (optical character recognition) analysis and store data related to the license plate in local database 104 and upload to the remote database 106 if connected to the communication network 108.

Figure 5:
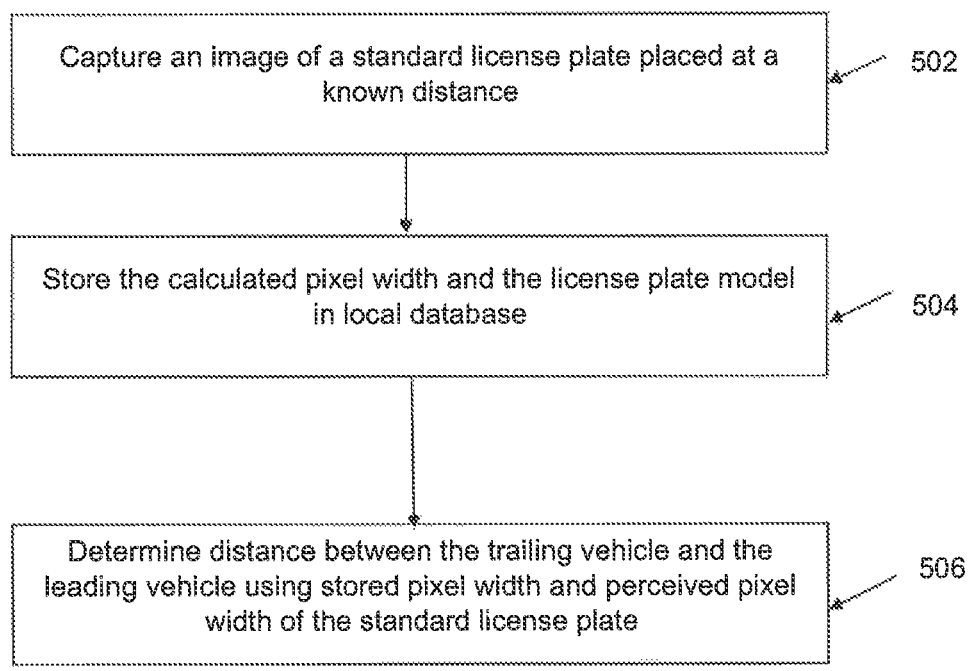
FIG. 5 is a flowchart illustrating a method of calculating distance between the trailing vehicle and the leading vehicle in accordance with some embodiments of the present disclosure.

At step 304, Identify, by safe tailgating computing device 102, the width of license plate in pixels using an image library like OpenCV and find the distance of the leading vehicle using triangle similarity algorithm and license plate width obtained by country code lookup using GPS (this method of distance calculation to be explained by way of FIG. 5). OpenCV can be used to identify the license number plate and its width in pixels. Current speed can be measured using accelerometer 126 in the safe tailgating computing device 102 and the speed may be compared with a seconds Rule lookup table as shown in table 1. Best way for the driver to avoid tail-gate accidents is to create a cushion by keeping at least 2 seconds between his vehicle and the leading vehicle. In poor driving conditions this can be increased to 3, 6, or 8 seconds to give sufficient stopping time.

TABLE 1

| Speed mpb | Distance travelled feet/s | 2 s buffer | 3 s buffer | 6 s buffer | 8 s buffer |
|---|---|---|---|---|---|
| 25 | 37 | 64 ft | 111 ft | 222 ft | 296 ft |
| 35 | 52 | 114 ft | 166 ft | 312 ft | 416 ft |
| 45 | 66 | 132 ft | 198 ft | 396 ft | 528 ft |
| 55 | 81 | 162 ft | 243 ft | 486 ft | 648 ft |
| 65 | 96 | 192 ft | 288 ft | 576 ft | 768 ft |
| 75 | 111 | 222 ft | 333 ft | 666 ft | 888 ft |

Software including OpenCV can be a mobile phone application or a separate high resolution front facing camera connected to digital navigational display of the trailing vehicle.

At step 306, capture, by the safe tailgating computing device 102, the license plate number using OCR and lookup the driver information in remote database 106 and gather his safety ratings. Remote database 106 may be a crowd sourced global driver database. The license plate is used to get data about the leading vehicle and the leading vehicle driver details and his safety ratings.

At step 308, dynamically generate, by the safe tailgating computing device 102, a tailgating zone classifier table using one of one or more vehicle parameters, one or more driving pattern parameters, or one or more driving condition parameters associated with the at least one leading vehicle obtained from the captured image of the standardized identification plate. The tailgating zone classifier table comprising a plurality of safe distance buffer zones, each of the plurality of safe distance buffer zones associated with a range of distance values. By way of example only, now the process of dynamic generation of the a tailgating zone classifier table using one of one or more vehicle parameters, one or more driving pattern parameters, or one or more driving condition parameters associated with the at least one leading vehicle will be explained.

For example, table 2 pertaining to various parameters with values/weights assigned, is as follows:

TABLE 2

| | |
|---|---|
| Normal | 1 |
| bad weather | 2 |
| expert driver | 0.75 |
| bad driver | 2 |
| bad driver and bad weather | 4 |
| High driver perception-reaction, Good vehicle maintenance | .75 |

TABLE 2-continued

| | |
|---|---|
| history, Good weather, High rating for driver in front, light weight vehicle | |
| High driver perception-reaction, Good Vehicle maintenance, Bad weather, High rating for driver in front, light weight vehicle | 2 |
| High driver perception-reaction, Bad vehicle maintenance history, Good weather, High rating for driver in front, light weight vehicle | 3 |

It is to be understood that above list of parameters is illustrative only and there can be numerous vehicle parameters, driving pattern parameters, driving condition parameters, or their combination thereof.

After the weights/values have been assigned to the parameters, a time buffer table will be generated. By way of example only, suppose the parameter has a value of 1. The time buffer table may comprise a row of standard time buffer values, such as 2, 3, 6, 8, 9 seconds, and further comprise a row of modified buffer values, such as, 2, 3, 6, 8, 9 seconds.

It is pertinent to note that, in this exemplary scenario, due to the normal conditions, the time buffer values in the standard and modified time buffer rows are the same, i.e. there is no alteration of the standard time buffer values in the modified time buffer values row. After the time buffer table has been generated, an exemplary tailgating zone classifier table 3 is generated based on the modified time buffer values,

TABLE 3

| Speed mph | Average Speed (feet/s) | D1 (2 s time buffer) | D2 (3 s time buffer) | D3 (6 s time buffer) | D4 (8 s time buffer) | D5 (9 s time buffer) |
|---|---|---|---|---|---|---|
| 10-30 | 37 | 0-74 | 74-111 | 111-222 | 222-296 | 296-333 |
| 30-40 | 52 | 0-104 | 104-156 | 156-312 | 312-416 | 416-468 |
| 40-50 | 66 | 0-132 | 132-198 | 198-396 | 396-528 | 528-594 |
| 50-60 | 81 | 0-162 | 162-243 | 243-486 | 486-648 | 648-729 |
| 60-70 | 96 | 0-192 | 192-288 | 288-576 | 576-768 | 768-864 |
| 70-80 | 111 | 0-222 | 222-333 | 333-666 | 666-888 | 888-999 |

Now if we select the parameter High driver perception-reaction, Good vehicle maintenance history, Good weather, High rating for driver in front, light weight vehicle that has a value of 0.75, a generated time buffer table may, for example, comprise a row of standard time buffer values, such as 2, 3, 6, 8, 9 seconds and further comprise a row of modified time buffer values having values, such as, 1.5, 2.25, 2.5, 6, 6.75 seconds.

It is pertinent to note that, in this exemplary scenario, due to the changes in the parameter value, the time buffer values in the standard and modified time buffer rows are not the same, i.e. there is alteration of the standard time buffer values. After the time buffer table has been generated, exemplary tailgating zone classifier table 4 is generated based on the modified time buffer values.

TABLE 4

| Speed mph | Average Speed (feet/s) | D1 (1.5 s time buffer) | D2 (2.25 s time buffer) | D3 (4.5 s time buffer) | D4 (6 s time buffer) | D5 (6.75 s time buffer) |
|---|---|---|---|---|---|---|
| 10-30 | 37 | 0-55.5 | 55.5-83.25 | 83.25-166.5 | 166.5-222 | 222-249.75 |
| 30-40 | 52 | 0-78 | 78-117 | 117-234 | 234-312 | 312-351 |
| 40-50 | 66 | 0-99 | 99-148.5 | 148.5-297 | 297-396 | 396-445.5 |
| 50-60 | 81 | 0-121.5 | 121.5-182.25 | 182.5-364.5 | 364.5-486 | 486-546.75 |
| 60-70 | 96 | 0-144 | 144-216 | 216-432 | 432-576 | 576-648 |
| 70-80 | 111 | 0-166.5 | 166.5-249.75 | 249.75-499.5 | 666 | 749.25 |

In the table 4, it is pertinent to note that time buffer has changed due to which there are different range of distance values for D1, D2, D3, D4, and D5.

It is to be understood that the above method of generation of tables is illustrative and there can be numerous tables that can be generated based on numerous parameters assigned with various weights/values.

Figure 4:
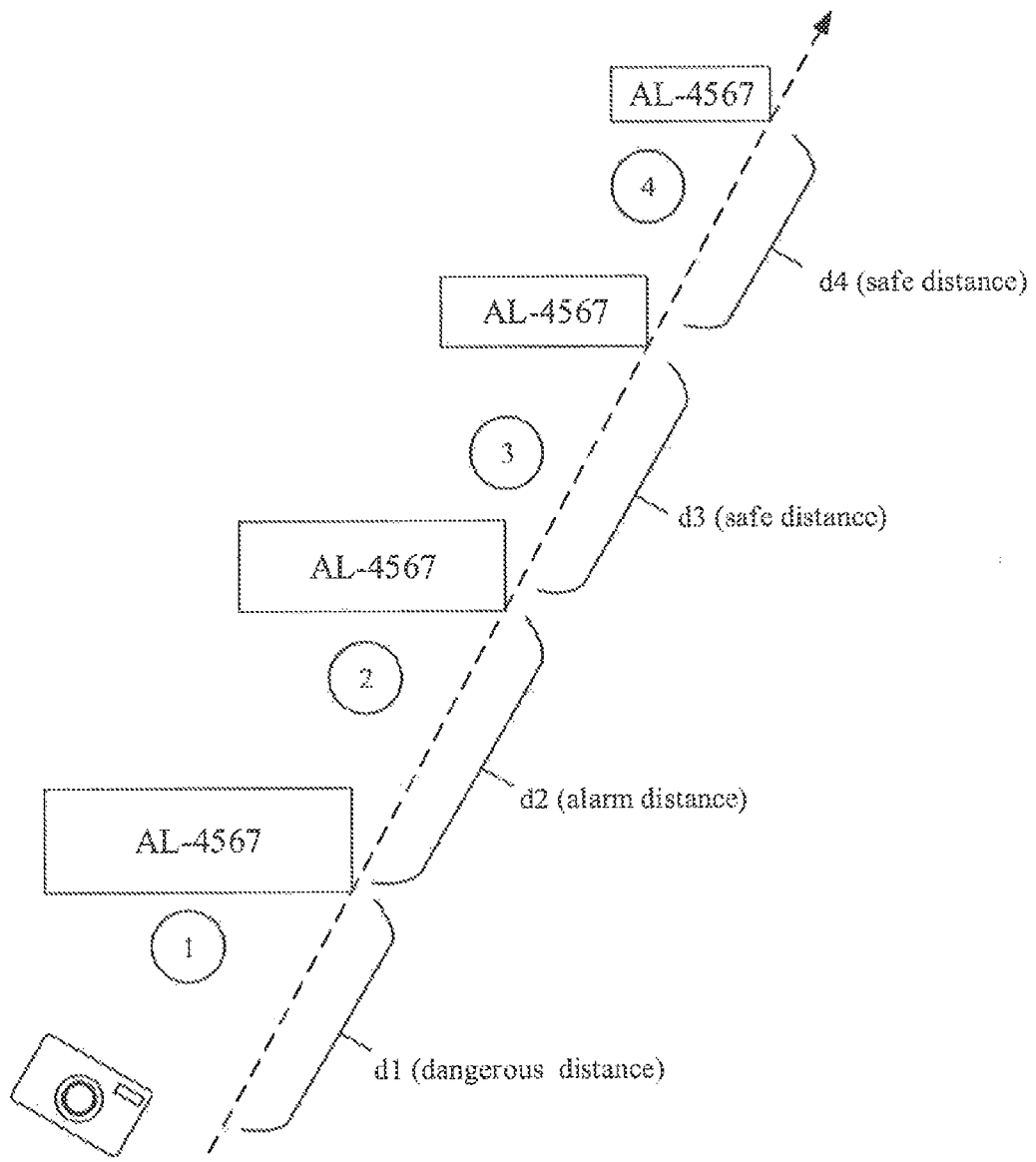
FIG. 4 illustrates a plurality of safe distance zones corresponding to different alarm levels, in accordance with another embodiment.

From tables 3 and 4, a tail gating condition is identified depending on various alert levels based on distance measured/safe distance buffer zones (D1, D2, D3, D4, and D5) with respect to the tailgating zone classifier table. The alert levels are with reference to safe distance buffer zones D1, D2, D3, D4, and D5. The levels with reference to the distances measured/safe distance buffer zones are classified as safe distance, alarm distance or dangerous distance as shown in FIG. 4.

At step 310, dynamically select, by the safe tailgating computing device 102, one of the plurality of safe distance buffer zones based on the distance between the at least one leading vehicle and the at least one trailing vehicle, wherein each of the plurality of safe distance buffer zones is indicative of one or more safe distance alarm levels.

At step 312, verbally alert, by the safe tailgating computing device 102, using the speakers 122 in driver's local language and display a warning in the driver's local language.

The driver of the trailing vehicle is alerted in case of tail gating possibility and can add a buffer of extra 2 seconds for it to detect a vehicle ahead within the accident range and alert the driver to change lanes. The safe tailgating computing device 102 can provide the ability to enable the driver irrespective of his visual skills and alert levels (such safe distance, alarm distance or dangerous distance shown with distances D1, D2, D3, D4, and D5 in FIG. 4), an accurate guidance based on automatic calculations.

At step 314, upload, by the safe tailgating computing device 102, the trailing driver habits and leading driver habits like over speeding and unsafe driving to the remote database and update the database by synchronizing to internet routinely.

Details of drivers of vehicles in case of over speeding to the remote database 106 may facilitate police to get the vehicle number and get its last location. This can be done by steps given below:
  i. Analyze the current user driving speed and check if he is over speeding the speed limit for the area and upload data.
  ii. Analyze if the driver ahead is over speeding if so upload data.

FIG. 5 is a flowchart 500 illustrating a method of calculating distance between the trailing vehicle and the leading vehicle in accordance with some embodiments of the present disclosure.

At step 502, capture an image of a standard license plate placed at a known distance (e.g., one feet) using an application. The image of the standard license plate can be captured using dashboard mounted smart phones rear camera or using a separate high resolution front facing camera connected to vehicles digital navigational display. For example, the license plate is kept at 1 meter or 1 feet ahead of the camera. The application can be conceived as a mobile phone application or as separate application with a front facing camera connected to the vehicle digital navigational display.

At step 504, store the calculated pixel width and the license plate model in local database 104. The calculated pixel width and the license plate model such as a standard license plate used in USA and/or Canada is stored in the local database 104. The model of the car is also stored. This is because the hood of the car will have different length for different cars. This standard pixel width for known dimensions of license plate obtained by a particular car model and phone model is stored in the remote database 106 and the local database 104.

At step 506, determine distance between the trailing vehicle and the leading vehicle using stored pixel width and perceived pixel width of the standard license plate. The distance is determined using license number plate size method, i.e. calculating distance of car ahead using D=(F×W)/P: The size of the license plate is standard in majority of countries. In U.S. and Canada, the size for license plates for vehicles, except those for motorcycles, is six inches in height by twelve inches in width, with standardized mounting holes. Similarly there are standard sizes for license/number plates in each country. The pixel width is calculated using the equation, P=(F×W)/D, where F is the perceived focal length, W is the known width, D is the distance of the object from camera and P is the perceived width in pixels. For example, if the focal length is Fstd 10, standard license plate width for the country Wstd is 12 inches and distance Dstd is 1 feets, then the perceived pixel width can be calculated as (10×12)/1=120 pixels.

$$Pstd=(Fstd \times Wstd)/Dstd=Fstd \times Wstd/1$$

With the known standardized pixel width information for a particular car model and phone we can calculate the distance to the vehicle ahead using $$Dva=(Fstd \times Wstd)/Pva$$

If standard pixel width is not available in local database 104 of safe tailgating computing device 102, it is looked up by unique keys of vehicle model number and phone model and country code in the remote database 106 and values are imported to the safe tailgating computing device 102.

For example if the license plate portion of the picture of the car ahead is having a Pva perceived pixel width of 60 pixels $$Dva=(Fstd \times Wstd)/Pva=Pstd/P=10 \times 12/60=120/60=2 \text{ ft}$$

Once the distance to front vehicle is known, this can be used to lookup in the tailgating zone classifier table based on current environment conditions to determine safe distance zones.

Figure 6:
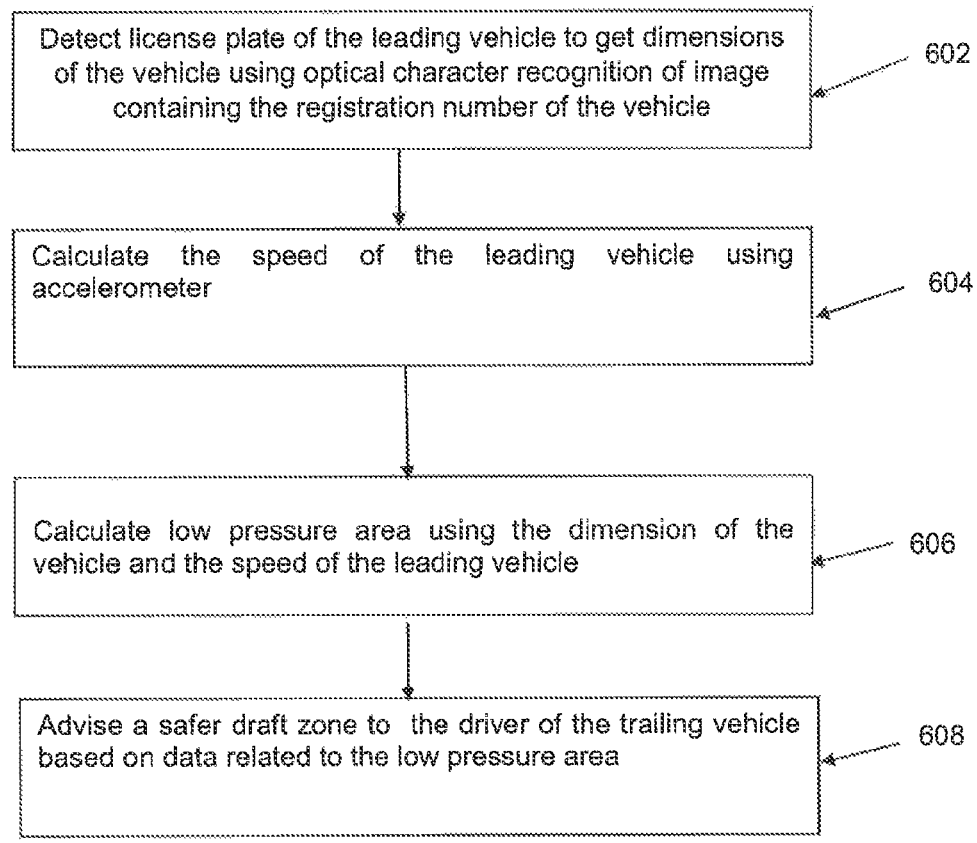
FIG. 6 is a flowchart illustrating a method of calculating safe drafting distance from the leading vehicle in accordance with some embodiments of the present disclosure.

FIG. 6 is a flowchart 600 illustrating the method of calculating safe drafting distance from the leading vehicle in accordance with some embodiments of the present disclosure.

At step 602, detect license plate of the leading vehicle to get dimensions of the vehicle using optical character recognition of image containing the registration number of the vehicle.

At step 604, calculate the speed of the leading vehicle using accelerometer 126.

At step 606, calculate low pressure area using the dimension of the vehicle and the speed of the leading vehicle.

At step 608, advice a safer draft zone to driver of the trailing vehicle based on data related to the low pressure area.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiments of the Present Disclosure are Illustrated Herein

In an embodiment, the present disclosure aims to avoid tailgating incidents by improving current systems. The present disclosure provisions a custom safety zone for a driver of a trailing vehicle behind a leading vehicle which is based on information of the current driver, his/her mental state, his/her normal response time, his/her age, the vehicle he/she is driving along with information of a leading vehicle driver, his/her driving habit history and the leading vehicle parameters.

In another embodiment of the present disclosure, in case of an accident, images prior to the accident, vehicle speed and GPS based location information are collated so as to recreate the events and understand the cause. Also, remote database 106 (crowd sourced database of drivers with their driving ratings) is maintained so that the drivers can avoid bad drivers. The database is available as a free cloud based REST API web service which can be accessed by any agencies and/or users. Moreover, the users can input a license plate number and get data about a vehicle, driver details and his ratings from the service. Input for the database can also come from standard official databases of drivers maintained by insurance companies etc.

In yet another embodiment, law enforcement agencies (or police officers) can input a license plate number and get driving violations with video or pictures of the incident along with geo location information. The Law enforcement agencies can have a hands free experience, where a mobile will scan the license plate number of the vehicle ahead and let them know the vehicle details, driver details without using any additional means to look up the license plate details and without stopping the vehicle in front. Thus they can be less intrusive and still do their job. This can save lives of the officers and prepare them for dealing with armed suspects. The live database will be helpful for the law enforcement agencies to track suspect vehicles they are looking for like in case of kidnapping. Since we have many cameras on road rapidly updating about the location of vehicles ahead, the police can log in to database, enter a vehicle number and get its last location.

In some embodiments of the present disclosure, a user is facilitated to capture speed of the vehicle in front with respect to the user's speed and distance between the vehicles captured by a mobile based license plate method. This may allow the users to catch violators and share the captured speed of the vehicle to the database as evidence. Furthermore, the present disclosure also uses information related to local weather, local highway alerts (such as information about a road being closed or person kidnapped from a particular location etc.) from an Internet Web service to educate drivers live and to accurately predict a safe distance. The users may also provide alert details to the database and may be rewarded with a share of ticket income or with discounts for vehicle insurance.

In a further embodiment of the present disclosure, a dynamic drafting zone is provided for the car driven which leads to saving of the fuel.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for facilitating safe tailgating by at least one trailing vehicle behind at least one leading vehicle, the method comprising:
    capturing, by a safe tailgating computing device, an image of a standardized identification plate of the at least one leading vehicle, the safe tailgating computing device being disposed on the at least one trailing vehicle;
    determining, by the safe tailgating computing device, a distance between the at least one leading vehicle and the at least one trailing vehicle based on width of the standardized identification plate and perceived pixel width of the captured image;
    dynamically generating, by the safe tailgating computing device, a tailgating zone classifier table based on at least one of one or more vehicle parameters, one or more driving pattern parameters, or one or more driving condition parameters associated with the at least one leading vehicle obtained from the captured image of the standardized identification plate, the tailgating zone classifier table comprising a plurality of safe distance buffer zones, each of the plurality of safe distance buffer zones associated with a range of distance values; and
    dynamically selecting, by the safe tailgating computing device, one of the plurality of safe distance buffer zones based on the distance between the at least one leading vehicle and the at least one trailing vehicle, wherein each of the plurality of safe distance buffer zones is indicative of one or more safe distance alarm levels.

2. The method as claimed in claim 1, wherein dynamically generating the tailgating zone classifier table comprises:
    assigning at least one weight to each of the one or more vehicle parameters, one or more driving pattern parameters, and one or more driving condition parameters associated with the at least one leading vehicle; and
    changing the range of distance values based on the assigned weight to each of the one or more vehicle parameters, one or more driving pattern parameters, and one or more driving condition parameters associated with the at least one leading vehicle.

3. The method as claimed in claim 1, further comprising:
    generating at least one of a visual alert and an audio alert based on current speed of at least one of the at least one trailing vehicle and the at least one leading vehicle and the distance between the at least one trailing vehicle and the at least one leading vehicle, wherein the current speed and the distance are indicative of a tailgating condition.

4. The method as claimed in claim 1, wherein dynamically selecting one of the plurality of safe distance buffer zones comprises:
    capturing an image of the standard identification plate placed at a predetermined distance from the safe tailgating computing device;
    calculating pixel width of the captured image of the standard identification plate;
    storing the calculated pixel width and width of the standard identification plate;
    calculating distance between the at least one trailing vehicle and the at least one leading vehicle based on the calculated pixel width and perceived pixel width of the standard identification plate; and
    looking up the tailgating zone classifier table to dynamically select one of the plurality of safe distance buffer zones based on the distance.

5. The method as claimed in claim 1, further comprising:
    dynamically selecting one of a plurality of safe draft buffer zones, dynamically selecting one of the plurality of safe draft buffer zones comprises:

obtaining dimension of the at least one leading vehicle by optically recognizing the standardized number plate;

calculating speed of the at least one leading vehicle;

determining a low pressure area behind the at least one leading vehicle based on the dimension of the at least one leading vehicle and the calculated speed of the at least one leading vehicle; and communicating data related to the low pressure area to the at least one trailing vehicle.

6. The method as claimed in claim 1, wherein the one or more vehicle parameters comprise at least one of model of the at least one leading vehicle, make of the at least one leading vehicle, dimension of the at least one leading vehicle, weight of the at least one leading vehicle, or maintenance history of the at least one leading vehicle.

7. The method as claimed in claim 1, wherein the one or more driving pattern parameters comprise at least one of mental alertness of driver, age of the driver, or safety ratings of the driver.

8. A safe tailgating computing device comprising:

at least one processor;

a memory coupled to the at least one processor, the memory storing instructions, that when executed by the at least one processor, causes the at least one processor to perform operations comprising:

capturing an image of a standardized identification plate of the at least one leading vehicle, the safe tailgating computing device being disposed on the at least one trailing vehicle;

determining a distance between the at least one leading vehicle and the at least one trailing vehicle based on width of the standardized identification plate and perceived pixel width of the captured image;

dynamically generating a tailgating zone classifier table based on at least one of one or more vehicle parameters, one or more driving pattern parameters, or one or more driving condition parameters associated with the at least one leading vehicle obtained from the captured image of the standardized identification plate, the tailgating zone classifier table comprising a plurality of safe distance buffer zones, each of the plurality of safe distance buffer zones associated with a range of distance values; and dynamically selecting one of the plurality of safe distance buffer zones based on the distance between the at least one leading vehicle and the at least one trailing vehicle, wherein each of the plurality of safe distance buffer zones is indicative of one or more safe distance alarm levels.

9. The device as claimed in claim 8, wherein dynamically generating the tailgating zone classifier table comprises:

assigning at least one weight to each of the one or more vehicle parameters, one or more driving pattern parameters, and one or more driving condition parameters associated with the at least one leading vehicle; and changing the range of distance values based on the assigned at least one weight to each of the one or more vehicle parameters, one or more driving pattern parameters, and one or more driving condition parameters associated with the at least one leading vehicle.

10. The device as claimed in claim 8, wherein the memory stores further instructions, that when executed by the at least one processor, causes the at least one processor to perform operations comprising:

generating at least one of a visual alert and an audio alert based on current speed of at least one of the at least one trailing vehicle and the at least one leading vehicle and the distance between the at least one trailing vehicle and the at least one leading vehicle, wherein the current speed and the distance are indicative of a tailgating condition.

11. The device as claimed in claim 8, wherein dynamically selecting one of the plurality of safe distance buffer zones comprises:

capturing an image of the standard identification plate placed at a predetermined distance from the safe tailgating computing device;

calculating pixel width of the captured image of the standard identification plate;

storing the calculated pixel width and width of the standard identification plate;

calculating distance between the at least one trailing vehicle and the at least one leading vehicle based on the calculated pixel width and perceived pixel width of the standardized identification plate; and looking up the tailgating zone classifier table to dynamically select one of the plurality of safe distance buffer zones based on the distance.

12. The device as claimed in claim 8, wherein the memory stores further instructions, that when executed by the at least one processor, causes the at least one processor to perform operations comprising:

dynamically selecting one of a plurality of safe draft buffer zones, dynamically selecting one of the plurality of safe draft buffer zones comprises:

obtaining dimension of the at least one leading vehicle by optically recognizing the standardized number plate;

calculating speed of the at least one leading vehicle;

determining a low pressure area behind the at least one leading vehicle based on the dimension of the at least one leading vehicle and the calculated speed of the at least one leading vehicle; and communicating data related to the low pressure area to the at least one trailing vehicle.

13. The device as claimed in claim 8, wherein the one or more vehicle parameters comprise at least one of model of the at least one leading vehicle, make of the at least one leading vehicle, dimension of the at least one leading vehicle, weight of the at least one leading vehicle, or maintenance history of the at least one leading vehicle.

14. The device as claimed in claim 8, wherein the one or more driving pattern parameters comprise at least one of mental alertness of driver, age of the driver, or safety ratings of the driver.

15. A non-transitory computer readable medium having stored thereon instructions, that when executed by the at least one processor, causes the at least one processor to perform operations comprising:

capturing an image of a standardized identification plate of the at least one leading vehicle, the safe tailgating computing device being disposed on the at least one trailing vehicle;

determining a distance between the at least one leading vehicle and the at least one trailing vehicle based on width of the standardized identification plate and perceived pixel width of the captured image;

dynamically generating a tailgating zone classifier table based on at least one of one or more vehicle parameters, one or more driving pattern parameters, or one or more driving condition parameters obtained from the captured image of the standardized identification plate, the tailgating zone classifier table comprising a plurality of safe distance buffer zones, each of the plurality of safe distance buffer zones associated with a range of distance values; and dynamically selecting one of the plurality of safe distance buffer zones based on the distance between the at least one leading vehicle and the at least one trailing vehicle, wherein each of the plurality of safe distance buffer zones is indicative of one or more safe distance alarm levels.

16. The non-transitory computer readable medium as claimed in claim 15, wherein dynamically generating the tailgating zone classifier table comprises:

assigning at least one weight to each of the one or more vehicle parameters, one or more driving pattern parameters, and one or more driving condition parameters associated with the at least one leading vehicle; and changing the range of distance values based on the assigned at least one weight to each of the one or more vehicle parameters, one or more driving pattern parameters, and one or more driving condition parameters associated with the at least one leading vehicle.

17. The non-transitory computer readable medium as claimed in claim 15, wherein the memory stores further instructions, that when executed by the at least one processor, causes the at least one processor to perform operations comprising:

generating at least one of a visual alert and an audio alert based on current speed of at least one of the at least one trailing vehicle and the at least one leading vehicle and the distance between the at least one trailing vehicle and the at least one leading vehicle, wherein the current speed and the distance are indicative of a tailgating condition.

18. The non-transitory computer readable medium as claimed in claim 15, wherein dynamically selecting one of the plurality of safe distance buffer zones comprises:

capturing an image of the standard identification plate placed at a predetermined distance from the safe tailgating computing device;

calculating pixel width of the captured image of the standard identification plate;

storing the calculated pixel width and width of the standard identification plate;

calculating distance between the at least one trailing vehicle and the at least one leading vehicle based on the calculated pixel width and perceived pixel width of the standardized identification plate; and looking up the tailgating zone classifier table to dynamically select one of the plurality of safe distance buffer zones based on the distance.

19. The non-transitory computer readable medium as claimed in claim 15, wherein the memory stores further instructions, that when executed by the at least one processor, causes the at least one processor to perform operations comprising:

dynamically selecting one of a plurality of safe draft buffer zones, dynamically selecting one of the plurality of safe draft buffer zones comprises:

obtaining dimension of the at least one leading vehicle by optically recognizing the standardized number plate;

calculating speed of the at least one leading vehicle;

determining a low pressure area behind the at least one leading vehicle based on the dimension of the at least one leading vehicle and the calculated speed of the at least one leading vehicle; and communicating data related to the low pressure area to the at least one trailing vehicle.

20. The non-transitory computer readable medium as claimed in claim 15, wherein the one or more vehicle parameters comprise at least one of model of the at least one leading vehicle, make of the at least one leading vehicle, dimension of the at least one leading vehicle, weight of the at least one leading vehicle, or maintenance history of the at least one leading vehicle.

* * * * *